(12) United States Patent
Ford et al.

(10) Patent No.: US 8,231,469 B1
(45) Date of Patent: Jul. 31, 2012

(54) METHOD AND SYSTEM FOR TRACKING DROP-OUT EVENTS IN A WIRELESS GAMING SYSTEM

(75) Inventors: Jason Ford, Overland Park, KS (US); Kristopher J. Davis, Lawrence, KS (US); Michael S. Nasalroad, Prairie Village, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1436 days.

(21) Appl. No.: 11/029,997

(22) Filed: Jan. 4, 2005

(51) Int. Cl.
A63F 9/24 (2006.01)
A63F 13/00 (2006.01)
G06F 17/00 (2006.01)
G06F 19/00 (2006.01)

(52) U.S. Cl. ............... 463/42; 463/39; 463/40; 463/41

(58) Field of Classification Search .............. 463/39, 463/40, 41, 42
See application file for complete search history.

(56) References Cited

U.S. PATENT DOCUMENTS

| | | | |
|---|---|---|---|
| 6,443,839 B2 * | 9/2002 | Stockdale et al. ............ | 463/16 |
| 6,524,189 B1 | 2/2003 | Rautila ...................... | 463/40 |
| 6,530,841 B2 | 3/2003 | Bull et al. .................... | 463/42 |
| 6,554,707 B1 * | 4/2003 | Sinclair et al. ............... | 463/39 |
| 6,641,481 B1 * | 11/2003 | Mai et al. ..................... | 463/42 |
| 6,761,636 B2 * | 7/2004 | Chung et al. ................ | 463/42 |
| 6,793,580 B2 | 9/2004 | Sinclair et al. .............. | 463/25 |
| 6,800,029 B2 | 10/2004 | Rowe et al. .................. | 463/25 |
| 6,893,347 B1 * | 5/2005 | Zilliacus et al. ............. | 463/41 |
| 6,899,628 B2 * | 5/2005 | Leen et al. .................. | 463/42 |
| 6,908,389 B1 * | 6/2005 | Puskala ....................... | 463/40 |
| 7,258,614 B1 * | 8/2007 | Kates et al. ................. | 463/42 |
| 7,367,888 B1 * | 5/2008 | Chen et al. .................. | 463/42 |
| 2002/0006826 A1 * | 1/2002 | Hansted ....................... | 463/42 |
| 2002/0061743 A1 * | 5/2002 | Hutcheson et al. ......... | 455/426 |
| 2004/0148638 A1 * | 7/2004 | Weisman et al. ........... | 725/115 |
| 2004/0242322 A1 * | 12/2004 | Montagna et al. .......... | 463/29 |

OTHER PUBLICATIONS

Yahoo! Inc., Yahoo Games, http://help.yahoo.com/help/us/games/play, Accessed on Aug. 27,2007, Created on Jul. 5, 2004.*
Yahoo! Inc., Yahoo Games, http://help.yahoo.com/help/us/games/play, Accessed on Aug. 27,2007, Created on Jul. 5, 2004, (All dates pertaining to each individual page have been acknowledged on the accompanying Web Archive (http://www.archive.org) web pages.*
Force Forfeit, Created on Apr. 30, 2004, Accessed Nov. 19, 2010.*

* cited by examiner

*Primary Examiner* — David L Lewis
*Assistant Examiner* — Reginald Renwick

(57) ABSTRACT

A game server stores data pertaining game players prematurely dropping out from games during the occurrence of the games, either voluntarily, involuntarily, or both. The games involve use of the wireless devices, such as cell phones, PDAs, or other types of devices. The game server includes a processor and machine instructions executable by the processor making available the data, or a ranking for each game player derived from the data, to the game players. Thus, the game players can access the data and make an informed decision as to whether to include a particular game player in a future game, based on their past history of prematurely dropping out of games.

17 Claims, 2 Drawing Sheets

METHOD AND SYSTEM FOR TRACKING DROP-OUT EVENTS IN A WIRELESS GAMING SYSTEM

BACKGROUND

This invention relates to the field of game playing and more particularly to the field of games that are played with the aid of wireless communications devices, such as cellular telephones, personal digital assistants, or other portable communications devices that have features for connecting over a wireless network with a land-based gaming server.

The proliferation of wireless communications devices in the $21^{st}$ century has been accompanied by ever-advancing sets of features that are available on such devices. Whereas the cellular telephone was originally designed for two-way voice communication, such phones are now typically available with software and hardware features that include a multitude of other capabilities, including sending and receiving email, capturing, storing, transmitting and viewing digital photographs, Internet access, media presentations, and even games. Patents describing games using wireless devices include the following, all of which are incorporated by reference herein: U.S. Pat. Nos. 6,800,029; 6,793,580; 6,554,707; 6,530,841 and 6,524,189.

The present inventors have appreciated that it would be useful for game players in a wireless context to know whether their fellow game participants, or would-be participants, are "unreliable" or have a tendency to be a "quitter", i.e., a player participates in games initially but later quits the game prematurely during the course of the game. The present invention provides a system and method for recording instances of game players prematurely leaving a game and also providing a ranking (e.g., indicia, rating or score) related to reliability that is available to all the players so they can determine, in advance, whether particular players should not be included or invited to participate in a future game due to their past history of unreliability. The known prior art does not address this need.

SUMMARY

In a first aspect, a gaming server is provided which includes a database, a processor and machine instructions for execution by the processor. The database maintains statistical data, for a plurality of game players, regarding the extent to which each game player has prematurely dropped out of games, voluntarily and/or involuntarily, and, as such, tends to be unreliable. The server makes the data available for viewing by other game players, as a type of player-reliability measure. The statistics may also include a ranking or rating of the players as to their reliability, defined as how often or how many times a player voluntarily drops out of games during the course of games. As such, the game players can decide whether, or not, to include or invite a player in a game to be played when the statistics indicate that the player has a "low" reliability measure.

In practice, a user can drop out of a game in one of two ways. Firstly, a player can voluntarily ending play such as by pressing a QUIT button on their wireless device, which would cause a Quit message to be sent from the wireless device to the gaming server. Instances of voluntary ending of play are noted by the game server and the events added to the game player database. Secondly, a game player can involuntarily end their participation, such as when a system-disconnect occurs by the player losing wireless coverage. In this instance, a Quit message would not be sent to the server. When an involuntary drop-out occurs, the gaming server may detect the disconnect by losing a keepalive signal from the client, or by detecting client non-responsiveness to server messages. In one possible embodiment, the losing of the keepalive signal would be deemed an "involuntary" drop out situation and this event may or may not be included in the player's statistics or ranking. For example, the database may include statistics on involuntary drop outs for each game player, as an additional reliability measure.

Thus, in another aspect of this invention, a method is provided of playing games using wireless communication devices, comprising the steps of: (a) storing data pertaining to game players prematurely dropping out from games during the occurrence of the games at a central database, the games involving use of the wireless devices, and (b) making available the data, or a ranking (e.g., rating, score) for each game player derived from the data, to the game players.

In still another aspect of this invention, a method is provided of playing games using a wireless communication device, comprising the steps of: (a) accessing a central database with the wireless device and viewing data stored at the central database pertaining to one or more game players having previously prematurely dropping out from prior games during the occurrence of the games; wherein (b) the user of the wireless device may use the data, or a ranking derived from the data, to determine whether one or more game players should be included or invited in a future game.

These and still other aspects will be described in further detail in the following detailed description of a presently preferred embodiment of the invention.

DETAILED DESCRIPTION OF PREFERRED EMBODIMENT

Figure 1:
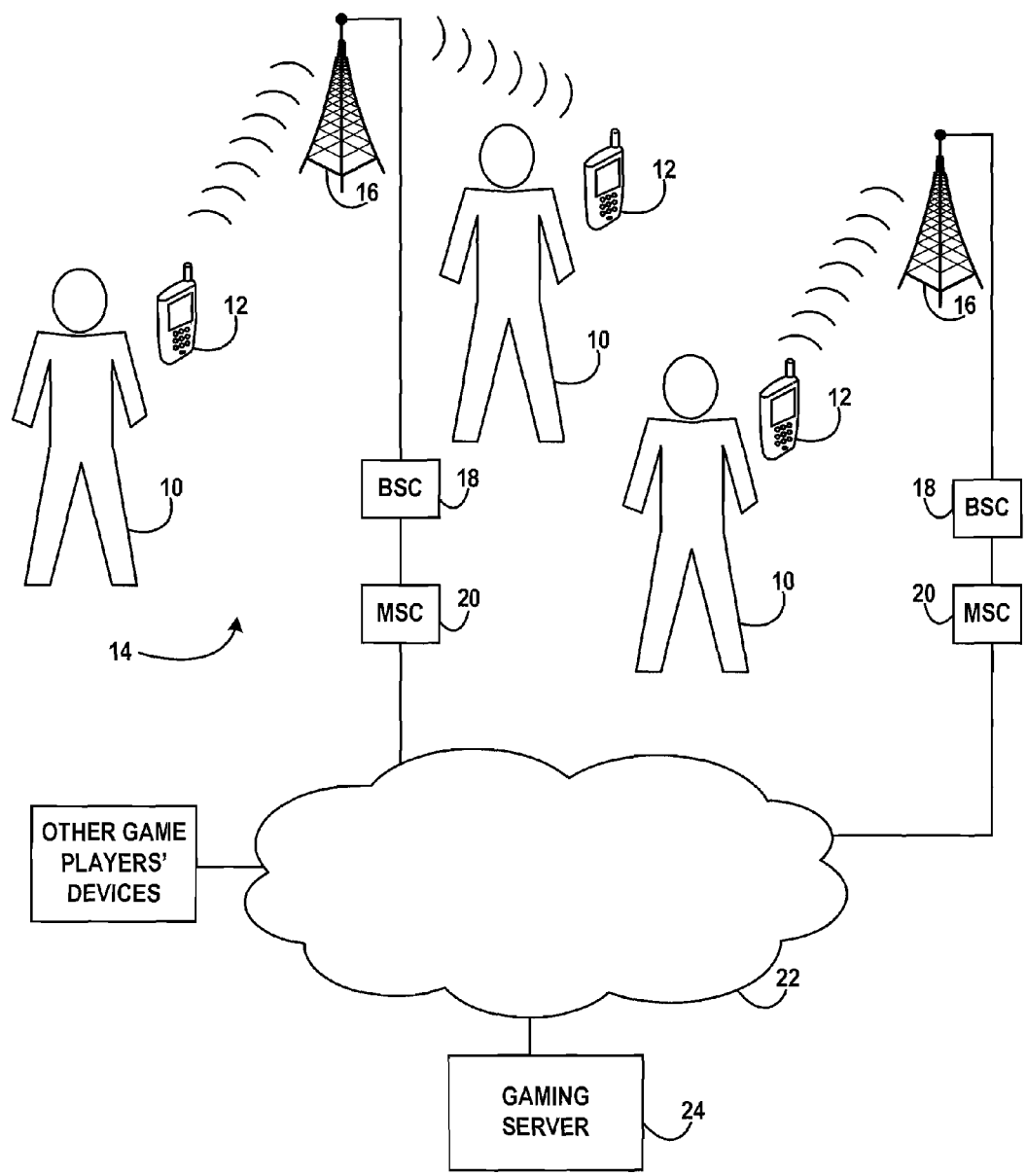
FIG. 1 is a diagram of a game environment in which the invention may be implemented, showing a plurality of game players, wireless gaming devices and a central gaming server on a network.

FIG. 1 is a diagram of a game environment in which the invention may be implemented. FIG. 1 shows a plurality of game players 10, each of whom uses a wireless gaming device 12 as a gaming apparatus with other players. The nature of the game is not particularly important and can take any form. The wireless devices 12 may take the form of a cellular telephone, personal digital assistant, laptop computer, special purpose game device, or otherwise, the details of which are not important and are known in the art. The game devices 12 include communications software and hardware that allow them to communicate with each other, and preferably also with a central gaming server 24.

In an example where the gaming devices are cellular telephones or are equipped with cellular telephony communications apparatus, the devices 12 exchange messages with each other and with the central server 24 over a conventional communications network infrastructure 14. The network infrastructure is conventional and known in the art and consists of a wireless base station antenna 16 which sends and receives signals over an air interface. The base station antennae 16 are coupled to a base station controller 18 and a mobile switching center 20. The mobile switching center is coupled either directly or through a packet data serving node to a cellular telephony service provider backbone network 22. The network is typically implemented as a packet-switched network and may be a local or wide area network using an Internet Protocol such as IPv6 as a protocol for transmitting messages between network entities.

The central gaming server 24 may be implemented as a host server, workstation, or general purpose computer on the network 24. The gaming server functionality may also be incorporated into a server or system providing additional functionality for the wireless devices 12, such as authentication, billing, game supervision, Web server (HTML server), or communication access functionality, such as mobile IP home agent or foreign agent functions.

Figures 2, 3:
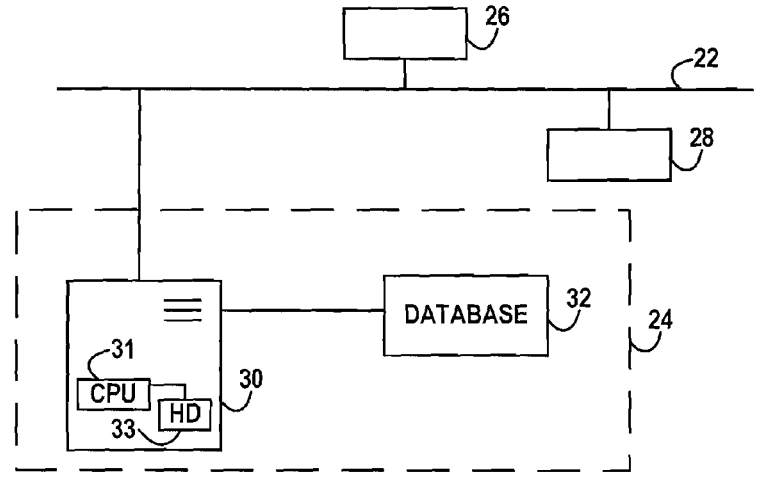
FIG. 2 is a diagram of one possible embodiment of a central gaming server.
FIG. 3 is an illustration of a set of user profiles stored in the database of FIG. 2, showing both statistical data as to both voluntary and involuntary dropout events for each of the game players, as well as two different examples of ranks or ratings that are assigned to each player based on the data. It will be understood that other types of data could be stored in the profile and that the example of FIG. 3 is provided by way of illustration and not limitation.

FIG. 2 shows one possible embodiment for the gaming server 24. The gaming server includes a workstation 30 having a processor 31 (Intel Pentium, etc.) and a memory 33, such as local hard disk, storing machine-readable instructions for execution by the processor to implement the gaming features described herein. The gaming server also includes a database 32 of game player profiles. The game player profiles include statistical data on user reliability, as explained below. The database 32 could be resident in the memory in the workstation 30 or could be implemented in a separate platform. In FIG. 2, the network 22 shows other computing resources 26 and 28 which may be utilized in the playing of games, such as keeping scores, receiving and recording wagers, accounting, authentication, location determination, etc.

FIG. 3 is an illustration of a plurality of user profiles 40, 42, 44 stored in the database 32 of FIG. 2 for three players Tom (10A), Peter (10B) and Mary 10C). The user profiles include statistical data as to both voluntary and involuntary dropout events for each of a plurality of game players Tom 10A, Peter 10B, and Mary 10C. FIG. 3 also shows two different examples of ranks or ratings that could be assigned to each player 10 based on the data. It will be understood that other types of data could be stored in the profile and that the example is provided by way of illustration and not limitation.

In the example of FIG. 3, each user profile 40, 42 and 44 is in table format. The table includes a field 50 for the total number of games played by the player, a field 52 for containing the number of voluntary drop events, a field 54 for containing the number of involuntary drop-out events, a field 56 for a rank of the player based on the data in fields 50, 52 and/or 54, a field 58 for a second type of rank, and a field 60 identified as "other", meaning that still other fields could be provided in the profile depending on the type of games and the features that are provided. For example, field 60 could include the players' winnings or total score in the game, identification information, personal information (address, phone number) and so forth.

In the example of the field 40 for Tom, Tom has played 14 games as indicated at 62, and has 4 voluntary drop outs as indicated at 64, and 2 involuntary dropouts, as indicated at 66. The first rank 56 is "good" as indicated at 68, where the rank of "good" is assigned to players with less than a 33% drop out rate (or other configurable ranking scheme). The second rank field 58 provides a raw score of the player's voluntary drop out rate, here 29% for Tom. Obviously, additional rank fields could be provided, such as a rank based on combined involuntary and voluntary drop outs events, or a rank based on the ratio of involuntary drop outs to games played. The main idea here is that the profile 40 simply contain statistical data of games played and drop out data, which may be involuntary or voluntary, and also preferably ranking data such as shown at in 68 and 70. The profile 42 for Peter shows Peter's data. Peter is ranked "poor" since he has a voluntary drop out rate of greater than 50% of the games he has played. The profile for Mary 44 shows that Mary has an "excellent" reliability rank, since she has voluntarily dropped out only 4% of the time.

During the course of a game, the gaming serve 24 monitors a keepalive signal from the players which indicates that they are still connected. If a player wishes to quit, they press a quit button on their device or otherwise send a message to the gaming server indicating they are voluntarily quitting a game in progress. The quit signal is sent via the wireless network infrastructure 14 to the gaming server 24. The gaming server records this quit event by increasing the value of the field 52 by one. If the keepalive signal is lost (or other event occurs indicating the players has lost wireless connection to the wireless network 14), then the value of the field 54 is also increased by one.

Ideally, each game player can access the database 32 and review the statistical data of potential game participants in advance of initiating a game. The game players thus can decide, based on the statistics alone or from the rankings, whether they wish to include a game player in a new game. For example, since Peter has a "Poor" score and drops out of more than 50 percent of the games he has played in, when Mary is considering whether to start or join in a new game and she sees that Peter is also playing, she may decide to pass. The game players preferably access the database using the user interface on their wireless gaming device. An example of how this could occur is by launching an Internet access application or web browser, navigating to a web page where the database profiles are displayed, and then viewing the web page on their device. In this example, the gaming server workstation 30 of FIG. 2 functions as a HTML web page server in addition to a workstation receiving quit messages and updating fields in a database.

From the foregoing, it will be appreciated that we have described a gaming server 24 which includes a database 32, a processor 31 and machine instructions for execution by the processor 31. The database 32 maintains statistical data, for a plurality of game players, of an extent to which each game player has prematurely voluntarily dropped out of games (and as such, tends to be unreliable). See FIG. 3. The server makes the data available for viewing by users in a gaming community (i.e., other game players), as a type of player-reliability measure. The statistics may also include a ranking 56, 58 or rating of the players as to their reliability, for example defined as how often or how many times a player voluntarily drops out of games during the course of games. As such, the game players 10 can decide whether, or not, to include or invite a player in a game to be played (or participate in a game) based on their evaluation of the data, e.g., where the data in the profile indicates that the player has a poor reliability record.

As noted above, a user can drop out of a game in one of two ways. Firstly, a player can voluntarily ending play such as by pressing a QUIT button on their wireless device, which would cause a Quit message to be sent from the wireless device 12 to the gaming server 24. Instances of voluntary ending of play are noted by the game server and the events added to the game player database, such as by increasing the count in field 52 by one. Secondly, a game player can involuntarily end their participation, such as when a system-disconnect occurs by the player losing wireless coverage. In this instance, a Quit message would not be sent to the server. When an involuntary drop-out occurs, the gaming server may detect the disconnect by losing a keepalive signal from the client, or by detecting client non-responsiveness to server messages. In one possible embodiment, the losing of the keepalive signal would be deemed an "involuntary" drop out situation and this event may or may not be included in the player's statistics or ranking. For example, the database may include statistics on involuntary drop outs for each game player (such as shown in the involuntary field 54), as an additional reliability measure. Additional ranking could be provided solely on involuntary drop outs.

Thus, in another aspect of this invention, a method is provided of playing games using wireless communication devices, comprising the steps of: (a) storing data pertaining to game players prematurely voluntarily dropping out from games during the occurrence of the games at a central database 32 (FIG. 3), the games involving use of the wireless devices 12, and (b) making available the data, or a ranking (e.g., rating, score) for each game player derived from the data, to the game players. The making available of the data could be via serving web pages, by email messages, by SMS messages, or in any other convenient form.

In still another aspect of this invention, a method is provided of playing games using a wireless communication device, comprising the steps of: (a) accessing a central database 32 with the wireless device 12 and viewing data stored at the central database 32 pertaining to one or more game players having previously prematurely voluntarily dropping out from prior games during the occurrence of the games; wherein (b) the user of the wireless device 12 may use the data, or a ranking derived from the data, to determine whether one or more game players should be included or invited in a future game.

It is possible to organized the database into groups of players (e.g., players playing the same games, players playing games in the same geographic region, game players who choose to play with each other, and other methods as well.) In this situation, it may be advantageous to have the data stored at the central database and available to the game players such that the data is available for each game players in a predefined group of game players. Furthermore, each of the game players in the group may access the data for all the other game players in the group. This way, the players can easily keep track of the other players more easily.

Variations from the disclosed embodiments are contemplated without departure from the scope of the invention. Implementation details in the game server and the gaming devices are not important, and may change depending on the hardware configuration, game rules, communications protocols and mechanisms used, etc. The scope of the invention is to be determined by reference to the appended claims.

We claim:

1. A method comprising:
for each of a plurality of potential game participants, a game server (i) detecting each of a number of instances of the potential game participant having voluntarily dropped out from game play, (ii) detecting each of a number of instances of the potential game participant having involuntarily dropped out from game play, (iii) maintaining a first count of the number of the detected instances that the potential game participant voluntarily dropped out from game play, (iv) maintaining a second count of the number of the detected instances that the potential game participant involuntarily dropped out from game play and (v) establishing a ranking for the potential game participant based on at least one of the first and second counts of the number of detected instances, wherein the game play comprises use of a wireless device; and
prior to a given potential game participant initiating a game, the game server transmitting via a network to the given potential game participant (i) the first counts of the other potential game participants, (ii) the second counts of the other potential game participants, and (iii) the rankings of the other potential game participants.

2. The method of claim 1, wherein establishing the ranking for the potential game participant comprises assigning a reliability rating to the potential game participant based on the first and second counts for the potential game participant.

3. The method of claim 1, wherein detecting an instance of the potential game participant having voluntarily dropped out from game play comprises detecting a Quit message sent from the wireless device to a gaming server, wherein the Quit message is sent in response to pressing of a QUIT button on the wireless device during game play.

4. The method of claim 1, wherein detecting an instance of the potential game participant having involuntarily dropped out from game play comprises (i) the game server receiving a keepalive signal periodically transmitted from the wireless device to the game server while the potential game participant using the wireless device is engaged in game play with the wireless device and (ii) the game server registering a loss of the keepalive signal as an instance of the potential game participant having involuntarily dropped out from game play.

5. The method of claim 1, further comprising the given potential game participant initiating the game, wherein initiating the game comprises joining the game.

6. The method of claim 1, further comprising the given potential game participant initiating the game, wherein initiating the game comprises including at least one of the other potential game participants in the game.

7. The method of claim 1, further comprising the given potential game participant initiating the game, wherein initiating the game comprises inviting at least one of the other potential game participants to play in the game.

8. The method of claim 1, wherein transmitting via a network to the given potential game participant (i) the first counts of the other potential game participants, (ii) the second counts of the other potential game participants, and (iii) the rankings of the other potential game participants comprises providing in a web page (i) the first counts of the other potential game participants, (ii) the second counts of the other potential game participants, and (iii) the rankings of the other potential game participants.

9. The method of claim 1, wherein transmitting via a network to the given potential game participant (i) the first counts of the other potential game participants, (ii) the second counts of the other potential game participants, and (iii) the rankings of the other potential game participants comprises transmitting in an SMS message (i) the first counts of the other potential game participants, (ii) the second counts of the other potential game participants, and (iii) the rankings of the other potential game participants.

10. The method of claim 1, wherein the wireless device comprises a cellular telephone.

11. A game server facilitating game participant selection, comprising:
a processor and machine instructions executable by the processor to, for each of a plurality of potential game participants, detect (i) each of a number of instances of the potential game participant having voluntarily dropped out from game play and (ii) each of a number of instances of the potential game participant having involuntarily dropped out from game play, wherein the game play comprises use of a wireless device;

a database maintaining, for each of the plurality of potential game participants, (i) a first count of the number of the detected instances that the potential game participant voluntarily dropped out from game play and (ii) a second count of the number of the detected instances that the potential game participant involuntarily dropped out from game play, wherein the machine instructions are further executable by the processor to (i) for each of the plurality of potential game participants, establish a ranking for the potential game participant based on at least one of the first and second counts for the potential game participant and (ii) prior to a given potential game participant initiating a game, provide to the given potential game participant (a) the first counts of the other potential game participants, (b) the second counts of the other potential game participants, and (c) the rankings of the other potential game participants.

12. The game server of claim 11, wherein establishing the ranking for the potential game participant comprises assigning a reliability rating to the potential game participant based on the first and second counts for the potential game participant.

13. The game server of claim 11, wherein the wireless device comprises a cellular telephone.

14. A method comprising:

for each of a plurality of potential game participants, a game server (i) detecting each of a number of instances of the potential game participant having involuntarily dropped out from game play and (ii) maintaining a count of the number of the detected instances that the potential game participant involuntarily dropped out from game play, wherein the game play comprises use of a wireless device; and prior to a given potential game participant initiating a game, the game server transmitting via a network to the given potential game participant an indication of the counts of the other potential game participants.

15. The method of claim 14, wherein the indication of the counts of the other potential game participants comprises, for each of the other potential game participants, the count of the other potential game participant.

16. The method of claim 14, wherein the indication of the counts of the other potential game participants comprises, for each of the other potential game participants, a ranking based on the count of the other potential game participant.

17. The method of claim 14, wherein detecting an instance of the potential game participant having involuntarily dropped out from game play comprises (i) the game server receiving a keepalive signal periodically transmitted from the wireless device to the game server while the potential game participant using the wireless device is engaged in game play with the wireless device and (ii) the game server registering a loss of the keepalive signal as an instance of the potential game participant having involuntarily dropped out from game play.

* * * * *